(12) United States Patent
Kumar et al.

(10) Patent No.: US 9,826,033 B2
(45) Date of Patent: Nov. 21, 2017

(54) LOAD BALANCER BYPASS

(71) Applicant: Microsoft Technology Licensing, LLC, Redmond, WA (US)

(72) Inventors: Hemant Kumar, Bellevue, WA (US); Parveen Kumar Patel, Redmond, WA (US); Deepak Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/972,951

(22) Filed: Dec. 17, 2015

(65) Prior Publication Data

US 2016/0105499 A1 Apr. 14, 2016

Related U.S. Application Data

(63) Continuation of application No. 13/652,718, filed on Oct. 16, 2012, now Pat. No. 9,246,998.

(51) Int. Cl.
   *H04L 29/08* (2006.01)
   *H04L 12/54* (2013.01)
   *H04L 29/12* (2006.01)

(52) U.S. Cl.
   CPC ...... *H04L 67/1038* (2013.01); *H04L 61/2521* (2013.01); *H04L 67/2814* (2013.01); *H04L 12/56* (2013.01)

(58) Field of Classification Search
   CPC ............. H04L 12/2809; H04L 12/2834; H04L 12/2838; H04L 12/56; H04L 12/5619;
   (Continued)

(56) References Cited

U.S. PATENT DOCUMENTS 5,251,205 A 10/1993 Callon et al.
5,305,389 A 4/1994 Palmer
(Continued)

FOREIGN PATENT DOCUMENTS

CN 1481635 3/2004
CN 1578320 2/2005
(Continued)

OTHER PUBLICATIONS

Layer 4 Load Balancing Server Return Mode—Assmann—Jul. 29, 2011.*

(Continued)

*Primary Examiner* — Tauqir Hussain
*Assistant Examiner* — Boris Grijalva Lobos
(74) *Attorney, Agent, or Firm* — Workman Nydegger

(57) ABSTRACT

Redirecting message flows to bypass load balancers. A destination intermediary receives a source-side message that includes a virtual address of a load balancer as a destination, and that is augmented to include a network address of a destination machine as a destination. The destination intermediary determines that a source intermediary should address subsequent network messages that originate from a source machine and that are associated with the same multi-message flow to the destination machine while bypassing the load balancer. The destination intermediary modifies the source-side message so the destination for the source-side message addresses the destination machine, and passes the modified source-side message to the destination machine. The destination intermediary receives a response from the destination machine identifying the source machine as its destination, and modifies the response so a source address identifies the virtual address of the load balancer, and dispatches the modified response to the source machine.

14 Claims, 8 Drawing Sheets

(58) Field of Classification Search
CPC ............... H04L 12/562; H04L 12/5624; H04L 12/5678; H04L 12/568; H04L 12/5684; H04L 12/5689; H04L 41/00; H04L 41/08–41/0806; H04L 41/0813; H04L 41/0823–41/0833; H04L 67/1038; H04L 67/2814
See application file for complete search history.

(56) References Cited

U.S. PATENT DOCUMENTS

| | | | |
|---|---|---|---|
| 5,371,852 A | 12/1994 | Attanasio et al. | |
| 5,774,660 A | 6/1998 | Brendel et al. | |
| 5,892,903 A | 4/1999 | Klaus | |
| 5,924,116 A | 7/1999 | Aggarwal | |
| 6,061,349 A | 5/2000 | Coile et al. | |
| 6,070,191 A | 5/2000 | Narendran et al. | |
| 6,249,801 B1* | 6/2001 | Zisapel | G06F 9/505 |
| | | | 718/105 |
| 6,330,606 B1 | 12/2001 | Logue et al. | |
| 6,351,775 B1 | 2/2002 | Yu | |
| 6,427,187 B2 | 7/2002 | Malcolm | |
| 6,434,620 B1 | 8/2002 | Boucher et al. | |
| 6,438,652 B1 | 8/2002 | Jordan et al. | |
| 6,470,389 B1 | 10/2002 | Chung et al. | |
| 6,490,615 B1 | 12/2002 | Dias et al. | |
| 6,496,505 B2 | 12/2002 | La Porta et al. | |
| 6,587,431 B1 | 7/2003 | Almulhem et al. | |
| 6,615,317 B2 | 9/2003 | Roseborough et al. | |
| 6,671,259 B1 | 12/2003 | He et al. | |
| 6,704,278 B1 | 3/2004 | Albert et al. | |
| 6,732,237 B1 | 5/2004 | Jacobs | |
| 6,742,044 B1 | 5/2004 | Aviani et al. | |
| 6,779,017 B1 | 8/2004 | Lamberton et al. | |
| 6,871,347 B2 | 3/2005 | Hay | |
| 6,981,056 B1 | 12/2005 | Aviani et al. | |
| 7,024,466 B2 | 4/2006 | Outten et al. | |
| 7,039,709 B1 | 5/2006 | Beadle et al. | |
| 7,089,328 B1 | 8/2006 | O'Rourke et al. | |
| 7,133,905 B2 | 11/2006 | Dilley et al. | |
| 7,191,235 B1 | 3/2007 | O'Rourke et al. | |
| 7,280,557 B1 | 10/2007 | Biswas et al. | |
| 7,292,571 B2 | 11/2007 | Brown | |
| 7,324,512 B2 | 1/2008 | Larson et al. | |
| 7,328,237 B1* | 2/2008 | Thubert | H04L 29/12783 |
| | | | 370/392 |
| 7,383,327 B1 | 6/2008 | Tormasov et al. | |
| 7,478,173 B1 | 1/2009 | Delco | |
| 7,512,702 B1 | 3/2009 | Srivastava et al. | |
| 7,565,423 B1 | 7/2009 | Fredricksen | |
| 7,567,504 B2 | 7/2009 | Darling et al. | |
| 7,590,736 B2 | 9/2009 | Hydrie et al. | |
| 7,613,822 B2 | 11/2009 | Joy et al. | |
| 7,685,109 B1 | 3/2010 | Ransil et al. | |
| 7,693,050 B2 | 4/2010 | Achlioptas et al. | |
| 7,697,557 B2 | 4/2010 | Segel | |
| 7,730,262 B2 | 6/2010 | Lowery et al. | |
| 7,757,005 B2 | 7/2010 | Larson et al. | |
| 7,761,664 B2 | 7/2010 | Gill | |
| 7,831,661 B2 | 11/2010 | Makhija et al. | |
| 7,886,076 B2 | 2/2011 | Brabson | |
| 7,904,562 B2 | 3/2011 | Takase et al. | |
| 7,937,438 B1 | 5/2011 | Miller et al. | |
| 8,031,713 B2 | 10/2011 | Chang et al. | |
| 8,112,545 B1 | 2/2012 | Ong | |
| 8,128,279 B2 | 3/2012 | Pryor et al. | |
| 8,201,237 B1 | 6/2012 | Doane et al. | |
| 8,244,864 B1* | 8/2012 | Bahl | H04L 67/148 |
| | | | 709/225 |
| 8,274,989 B1 | 9/2012 | Allan et al. | |
| 8,281,363 B1* | 10/2012 | Hernacki | H04L 29/08846 |
| | | | 709/225 |
| 8,291,007 B2 | 10/2012 | Orr et al. | |
| 8,416,692 B2 | 4/2013 | Patel et al. | |
| 8,429,294 B2 | 4/2013 | Bachmann et al. | |
| 8,493,851 B2 | 7/2013 | Fan | |
| 8,504,556 B1 | 8/2013 | Rice et al. | |
| 8,514,878 B1 | 8/2013 | Allan et al. | |
| 8,533,343 B1 | 9/2013 | Beda et al. | |
| 8,611,349 B1 | 12/2013 | Judge et al. | |
| 8,645,508 B1 | 2/2014 | Dickinson et al. | |
| 8,751,691 B1 | 6/2014 | Brandwine et al. | |
| 8,819,280 B1 | 8/2014 | Liu et al. | |
| 8,954,595 B2 | 2/2015 | Sundarrajan et al. | |
| 2001/0034752 A1 | 10/2001 | Kremien | |
| 2002/0032755 A1 | 3/2002 | Abrahams et al. | |
| 2002/0040402 A1 | 4/2002 | Levy-Abegnoli et al. | |
| 2002/0059429 A1 | 5/2002 | Carpenter et al. | |
| 2002/0078174 A1 | 6/2002 | Sim et al. | |
| 2003/0005080 A1 | 1/2003 | Watkins et al. | |
| 2003/0026410 A1 | 2/2003 | Lumsden | |
| 2003/0031176 A1 | 2/2003 | Sim | |
| 2003/0056002 A1 | 3/2003 | Trethewey | |
| 2003/0097405 A1 | 5/2003 | Laux et al. | |
| 2003/0105903 A1 | 6/2003 | Garnett et al. | |
| 2003/0156535 A1 | 8/2003 | Lebizay et al. | |
| 2003/0202536 A1 | 10/2003 | Foster et al. | |
| 2004/0024853 A1 | 2/2004 | Cates et al. | |
| 2004/0030765 A1 | 2/2004 | Zilbershtein et al. | |
| 2004/0109447 A1 | 6/2004 | Douglass et al. | |
| 2004/0117794 A1 | 6/2004 | Kundu | |
| 2004/0162914 A1 | 8/2004 | St. Pierre et al. | |
| 2004/0167981 A1 | 8/2004 | Douglas | |
| 2004/0172466 A1 | 9/2004 | Douglas | |
| 2004/0254943 A1 | 12/2004 | Malcolm | |
| 2004/0260745 A1 | 12/2004 | Gage et al. | |
| 2005/0055435 A1 | 3/2005 | Gbadegesin et al. | |
| 2005/0097185 A1 | 5/2005 | Gibson et al. | |
| 2005/0132030 A1 | 6/2005 | Hopen et al. | |
| 2005/0149531 A1 | 7/2005 | Srivastava | |
| 2005/0188055 A1 | 8/2005 | Saletore | |
| 2005/0188065 A1* | 8/2005 | O'Rourke | H04L 12/4633 |
| | | | 709/223 |
| 2005/0198238 A1 | 9/2005 | Sim et al. | |
| 2005/0232274 A1 | 10/2005 | Kadambi et al. | |
| 2005/0249199 A1 | 11/2005 | Albert et al. | |
| 2005/0261985 A1 | 11/2005 | Miller et al. | |
| 2006/0002292 A1 | 1/2006 | Chang et al. | |
| 2006/0123416 A1 | 6/2006 | Cibrario Bertolotti et al. | |
| 2006/0206658 A1 | 9/2006 | Hendel et al. | |
| 2006/0294584 A1 | 12/2006 | Sundaram | |
| 2007/0055789 A1 | 3/2007 | Claise et al. | |
| 2007/0081530 A1* | 4/2007 | Nomura | H04L 12/185 |
| | | | 370/389 |
| 2007/0124476 A1 | 5/2007 | Oesterreicher et al. | |
| 2007/0165622 A1 | 7/2007 | O'Rourke et al. | |
| 2007/0283023 A1 | 12/2007 | Ly et al. | |
| 2008/0008202 A1 | 1/2008 | Terrell et al. | |
| 2008/0019365 A1 | 1/2008 | Tripathi et al. | |
| 2008/0059747 A1 | 3/2008 | Burckart et al. | |
| 2008/0104273 A1 | 5/2008 | Bruck et al. | |
| 2008/0183854 A1 | 7/2008 | Hopen et al. | |
| 2008/0201540 A1 | 8/2008 | Sahita et al. | |
| 2008/0222281 A1 | 9/2008 | Dilley et al. | |
| 2008/0259917 A1 | 10/2008 | Hua et al. | |
| 2008/0288941 A1 | 11/2008 | Adams et al. | |
| 2008/0313318 A1 | 12/2008 | Vermeulen et al. | |
| 2009/0063706 A1 | 3/2009 | Goldman et al. | |
| 2009/0248871 A1 | 10/2009 | Takase et al. | |
| 2009/0276607 A1 | 11/2009 | Bonola | |
| 2010/0017519 A1 | 1/2010 | Han et al. | |
| 2010/0036903 A1 | 2/2010 | Ahmad et al. | |
| 2010/0036954 A1 | 2/2010 | Sakata et al. | |
| 2010/0057898 A1 | 3/2010 | Imai | |
| 2010/0080226 A1 | 4/2010 | Khalid et al. | |
| 2010/0095008 A1 | 4/2010 | Joshi | |
| 2010/0185817 A1 | 7/2010 | Magenheimer | |
| 2010/0218254 A1 | 8/2010 | Gray et al. | |
| 2010/0257263 A1 | 10/2010 | Casado et al. | |
| 2010/0268764 A1 | 10/2010 | Wee et al. | |
| 2010/0274890 A1 | 10/2010 | Patel et al. | |
| 2010/0302940 A1 | 12/2010 | Patel et al. | |
| 2010/0318609 A1 | 12/2010 | Lahiri et al. | |
| 2010/0322088 A1 | 12/2010 | Muthiah et al. | |

(56) References Cited

U.S. PATENT DOCUMENTS

| | | | |
|---|---|---|---|
| 2010/0322250 | A1 | 12/2010 | Shetty et al. |
| 2010/0332595 | A1 | 12/2010 | Fullagar et al. |
| 2011/0019531 | A1 | 1/2011 | Kim et al. |
| 2011/0023029 | A1 | 1/2011 | Diab et al. |
| 2011/0023114 | A1 | 1/2011 | Diab et al. |
| 2011/0222535 | A1 | 9/2011 | Suganthi et al. |
| 2011/0225231 | A1 | 9/2011 | Bansal et al. |
| 2011/0235508 | A1 | 9/2011 | Goel et al. |
| 2011/0267947 | A1 | 11/2011 | Dhar et al. |
| 2011/0276695 | A1 | 11/2011 | Maldaner |
| 2011/0317554 | A1 | 12/2011 | Greenberg et al. |
| 2012/0099601 | A1 | 4/2012 | Haddad et al. |
| 2012/0155266 | A1 | 6/2012 | Patel et al. |
| 2012/0185557 | A1 | 7/2012 | Di Marco et al. |
| 2012/0203866 | A1 | 8/2012 | Yoo et al. |
| 2012/0207174 | A1 | 8/2012 | Shieh |
| 2012/0246637 | A1 | 9/2012 | Kreeger et al. |
| 2012/0303809 | A1 | 11/2012 | Patel et al. |
| 2013/0148505 | A1 | 6/2013 | Koponen et al. |
| 2013/0159487 | A1 | 6/2013 | Patel et al. |
| 2013/0301413 | A1 | 11/2013 | Moen et al. |
| 2014/0006681 | A1 | 1/2014 | Chen et al. |
| 2014/0019602 | A1 | 1/2014 | Murthy et al. |
| 2014/0029430 | A1 | 1/2014 | Samuels et al. |
| 2014/0095649 | A1 | 4/2014 | Yoo et al. |
| 2014/0108655 | A1 | 4/2014 | Kumar et al. |
| 2014/0115135 | A1 | 4/2014 | Allan et al. |
| 2014/0149794 | A1 | 5/2014 | Shetty et al. |
| 2014/0185446 | A1 | 7/2014 | Patel et al. |
| 2014/0351395 | A1 | 11/2014 | Murthy et al. |
| 2015/0063115 | A1 | 3/2015 | Patel et al. |
| 2015/0381757 | A1 | 12/2015 | Yoo et al. |
| 2016/0026505 | A1 | 1/2016 | Murthy et al. |

FOREIGN PATENT DOCUMENTS

| | | |
|---|---|---|
| CN | 102436401 | 5/2012 |
| JP | 2002288038 | 10/2002 |
| JP | 2011041006 | 2/2011 |

OTHER PUBLICATIONS

H3C SecPath Series High-End Firewalls Web Manual—Sep. 2011—www.h3c.com.*
"International Search Report and Written Opinion Issued in PCT Application No. PCT/US2013/065159", dated Jan. 22, 2014, 11 Pages.
"Non-Final Office Action Issued in U.S. Appl. No. 13/652,718", dated Oct. 9, 2014, 23 Pages.
"Effects of Virtualization and Cloud Computing on Data Center Networks", Retrieved from <<http://web.archive.org/web/20121127070451/http://h20000.www2.hp.com/bc/docs/support/SupportManual/c03042885/c03042885.pdf>>, Oct. 2011, 16 Pages.
"Final Office Action Issued in U.S. Appl. No. 13/652,718", dated Mar. 5, 2015, 14 Pages.
"Notice of Allowance Issued in U.S. Appl. No. 13/652,718", dated Oct. 20, 2015, 4 Pages.
"Notice of Allowance Issued in U.S. Appl. No. 13/652,718", dated Sep. 18, 2015, 7 Pages.
Gulwani et al., WebCaL—A Domain Specific Language for Web Caching, May 2000, http://research.microsoft.com/en-us/um/people/sumitg/pubs/webcal_wcw00.pdf.
Lindemann, "Evaluating Cooperative Web Caching Protocols for Emerging Network Technologies," University of Dortmund, Department of Computer Science, Aug. 2001.
Naumenko, "Some Recommendations on Building Proxy caching Service", Pub date: Nov. 1998 (6 pages).
Wessels et al., "ICP and the Squid Web Cache", Pub date : Aug. 13, 1997 (25 pages).
Laoutaris, et al., "The Cache Inference Problem and its Application to Content and Request Routing", Pub. Date: May 29, 2007 (10 pages).
Das, et al., "Predicting Web Cache Behavior using Stochastic State-Space Models", In Proceedings of the Second International Workshop on Scalable Data Management Applications and Systems, Jul. 2008, 8 pages. Available at <<http://csl.cse.psu.edu/publications/cachepred-sdmas08.pdf>>.
Gill, Binny S., "On Multi-Level Exclusing Caching: Offline Optimality and Why promotions are better than demotions.", In 6th USENIX Conference on File and Storage Technologies, Feb. 27, 2008, 17 pages. Available at <<http://webcache.googleusercontent.com/search?q=cache:nwgGP4zklyAJ:static.usenix.org/event/fast08/tech/full_papers/gill/gill.pdf+&cd=1&hl=en&ct=clnk&gl=in>>.
Greenberg, et al., "Towards a Next Generation Data Center Architecture: Scalability and Commoditization", In Proceedings of the ACM Workshop on Programmable Routers for Extensible Services of Tomorrow, Aug. 17-22, 2008, pp. 57-62.
Alur, Sandeep J., "Enterprise Integration and Distributed Computing: A Ubiquitous Phenomenon", Published: Sep. 2008. Available at: http://msdn.microsoft.com/en-us/library/cc949110.aspx.
Joseph, et al., "A Policy-Aware Switching Layer for Data Centers", In Proceedings of the ACM SIGCOMM Conference on Data Communication, Aug. 17, 2008, pp. 51-62.
Al-Fares, et al., "Hedera: Dynamic Flow Scheduling for Data Center Networks", In Proceedings of the 7th USENIX Conference on Networked Systems Design and Implementation, Apr. 28, 2010, pp. 281-295.
Stage, et al., "Network-aware Migration Control and Scheduling of Differentiated Virtual Machine Workloads", In Workshop on Software Engineering Challenges in Cloud Computing, May 23, 2009, pp. 9-14.
"Load Balancing: Optimum Performance, Scalability and Resiliency", Available at least as early as Apr. 20, 2012, available at: http://www.contegix.com/solutions/managed-hosting/managed-services/load-balancing/.
Nehra, Neeraj, et al., "A Framework for Distributed Dynamic Load Balancing in Heterogeneous Cluster", Journal of Computer Science 3 (1): Jan. 2007 Science Publications, pp. 14-24.
Bunt, Richard B., et al., "Achieving Load Balance and Effective Caching in Clustered Web Servers", Proceedings of the Fourth International Web Caching Workshop, San Diego, CA, Apr. 1999, pp. 159-169.
K2 Colocation, Network Load Balancing Appliance, Intelligent Routing Network Appliance, "Flow Control Platform (FCP) Solutions", Jan. 4, 2007, 2 pages.
White Paper, Equalizer, "Purpose-Built Load Balancing the Advantages of Coyote Point Equalizer over Software-based Solutions", Copyright 2004 Coyote Point Systems, Inc. 9 pages. (The month of Publication is irrelevant since the year of Publication is clearly prior to the filing of the Application).
Microsoft TechNet, "MS Windows NT Load Balancing Service Whitepaper", Based on information and belief available, at least as early as Jul. 27, 2010, 9 pages.
HAProxy, "The Reliable, High Performance TCP/HTTP Load Balancer", Jul. 28, 2010, 10 pages.
Top Web Hosting, "Load Balancing", Copyright 2002-2010, Based on information and belief available ast least as early as Jul. 27, 2010, 6 pages.
Walcott, Costa, "Taking a load off: Load balancing with balance", Aug. 17, 2005, 7 pages.
InfoBPN Solutions on Business Process Networking Business and Process Automation, "Application Load Balancing Solution", Based on information and belief available, at least as early as Jul. 27, 2010.
First Office Action Received for Chinese Application No. 201110444322.1, dated Sep. 3, 2014, 12 Pages.
Second Office Action Issued in Chinese Patent Application No. 201110444322.1, dated Apr. 9, 2015, 6 Pages.
U.S. Appl. No. 13/006,694, Aug. 28, 2012, Office Action.
U.S. Appl. No. 13/006,694, Nov. 20, 2012, Notice of Allowance.
U.S. Appl. No. 13/022,527, Mar. 22, 2013, Office Action.
U.S. Appl. No. 13/022,527, Aug. 20, 2013, Notice of Allowance.
U.S. Appl. No. 14/096,697, Jul. 22, 2014, Office Action.
U.S. Appl. No. 14/096,697, Feb. 13, 2015, Office Action.

(56) References Cited

OTHER PUBLICATIONS

U.S. Appl. No. 14/096,697, Jun. 16, 2015, Notice of Allowance.
U.S. Appl. No. 14/847,204, Sep. 2, 2016, Office Action.
U.S. Appl. No. 13/547,805, Jan. 3, 2014, Office Action.
U.S. Appl. No. 12/972,340, Feb. 25, 2013, Office Action.
U.S. Appl. No. 12/972,340, Dec. 18, 2013, Notice of Allowance.
U.S. Appl. No. 13/115,444, Apr. 15, 2013, Office Action.
U.S. Appl. No. 13/115,444, Sep. 13, 2013, Office Action.
U.S. Appl. No. 13/115,444, Jan. 30, 2014, Office Action.
U.S. Appl. No. 12/972,340, Feb. 14, 2014, Notice of Allowance.
U.S. Appl. No. 13/547,805, Apr. 14, 2014, Notice of Allowance.
U.S. Appl. No. 14/198,465, Dec. 5, 2014, Office Action.
U.S. Appl. No. 14/452,314, Mar. 24, 2015, Notice of Allowance.
U.S. Appl. No. 14/198,465, Sep. 3, 2015, Office Action.
U.S. Appl. No. 14/804,381, Feb. 10, 2016, Notice of Allowance.
U.S. Appl. No. 14/546,729, May 24, 2016, Notice of Allowance.
Notice of Allowance dated Feb. 8, 2017 cited in U.S. Appl. No. 14/847,204.
Chinese Office Action issued in Chinese Patent Application No. 201380054147.2 dated Mar. 20, 2017.

* cited by examiner

| $VIP_D$ | $DIP_S$ | TCP Header | Data |

*Figure 6A*

| $DIP_D$ | MUX | $VIP_D$ | $DIP_S$ | TCP Header | Data |

*Figure 6B*

| $DIP_D$ | $DIP_S$ | TCP Header | Data |

*Figure 6C*

| $DIP_S$ | $DIP_D$ | TCP Header | Data |

*Figure 6D*

| $DIP_S$ | $VIP_D$ | $DIP_S$ | $DIP_D$ | TCP Header | Data |

*Figure 6E*

| $DIP_S$ | $VIP_D$ | TCP Header | Data |

*Figure 6F*

| $DIP_D$ | $DIP_S$ | $VIP_D$ | $DIP_S$ | TCP Header | Data |

*Figure 6G*

LOAD BALANCER BYPASS

CROSS-REFERENCE TO RELATED APPLICATION

This application is a continuation of U.S. patent application Ser. No. 13/652,718, filed Oct. 16, 2012, and entitled "LOAD BALANCER BYPASS," the entire contents of which are incorporated by reference herein in its entirety.

BACKGROUND

A load balancer allows multiple machines to be associated with a single virtual network address. Network messages that are addressed to the virtual network address are received by the load balancer, which decides which of multiple machines are to handle the network message. The load balancer then forwards the network message towards a destination intermediary. The destination intermediary then delivers the network message to the designated machine.

BRIEF SUMMARY

At least one embodiment described herein relates to bypassing a load balancer that initially appeared in a multi-message flow from a source machine served by a source intermediary and a destination machine served by a destination intermediary.

From one perspective, a destination intermediary computer system receives a source-side message from a load balancer. The source-side message includes a virtual network address of the load balancer as a destination. The source-side message was received by the load balancer from a source intermediary serving a source machine, and was augmented by the load balancer to include a network address of a destination machine that is served by the destination intermediary as a destination for the source-side message. The destination intermediary computer system determines that the source intermediary is to address subsequent network messages that originate from the source machine and that are associated with the same multi-message flow to the destination machine in a manner that bypasses the load balancer. Based on the determination, the destination intermediary computer system modifies the source-side message such that the destination for the source-side message addresses the destination machine, and passes the modified source-side message to the destination machine. Then, the destination intermediary computer system receives a response from the destination machine identifying the source machine as its destination, and modifies the response so that a source address of the response identifies the virtual network address of the load balancer. The destination intermediary computer system then dispatches the modified response to the source machine.

From another perspective, a source intermediary computer system receives a source-side message from a source machine. The source-side message has a virtual network address of a load balancer as a destination address, and has a routable device identifier of the source machine as a source address. The source intermediary computer system sends the source-side message to a load balancer serving a destination intermediary computer system. Based on sending the source-side message to the load balancer, the source intermediary computer system receives an augmented response from the destination intermediary computer system. The augmented response includes a response from a destination machine served by the destination intermediary computer system. The augmented response has the routable device identifier of the source machine as its destination, and has the virtual network address of the load balancer as its source. The source intermediary computer system extracts the response from the augmented response, and identifies a routable device identifier of the destination machine from the response. The source intermediary computer system also modifies the response so that a source address of the response includes the virtual network address of the load balancer, and dispatches the modified response to the source machine. The source intermediary computer system also redirects one or more subsequent messages received from the source machine to the destination machine, using the identified routable device identifier of the destination machine, to bypass the load balancer.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 6A through 6G illustrate various example data structures of a network message in various stages of processing.

DETAILED DESCRIPTION

Figure 1:
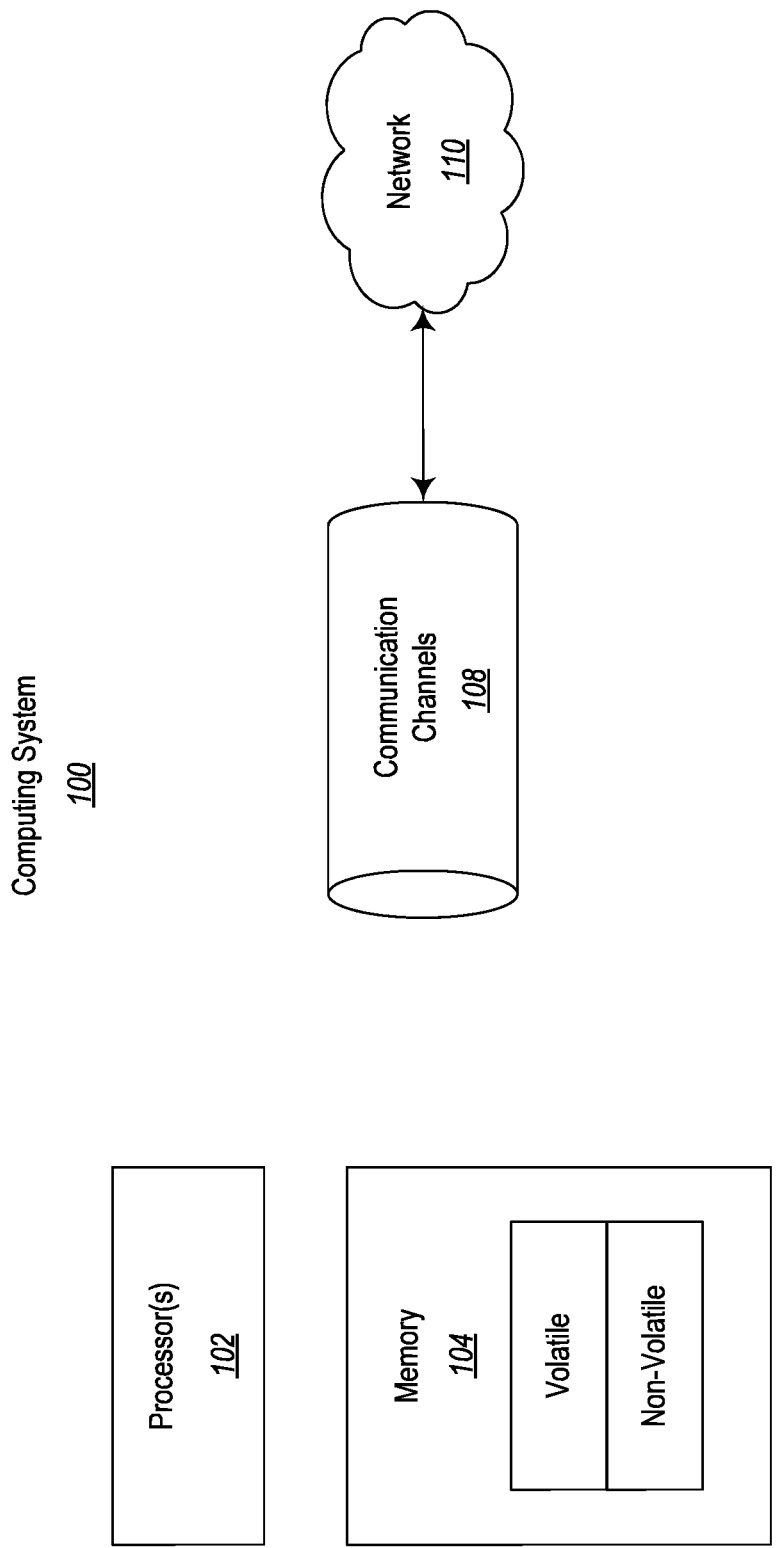
FIG. 1 abstractly illustrates a computing system in which some embodiments described herein may be employed.

In accordance with embodiments described herein, the bypassing of a load balancer is described. The load balancer initially appears in a multi-message flow from a source machine served by a source intermediary and a destination machine served by a destination intermediary.

One or more original network messages (and perhaps just the first) of the flow arrive from the source intermediary at the load balancer. The load balancer selects which machine is to handle the message, and it turns out selects the destination machine. The load balancer then dispatches the network message to the destination intermediary that serves the destination machine. In response to receiving this message, the destination intermediary instructs the source intermediary to transmit subsequent messages in the flow in a manner that bypasses the load balancer. To facilitate this, the source intermediary may modify addressing of subsequent flow messages from the source machine such that they are rerouted to the destination machine without addressing the load balancer.

While the network messages described herein may be Internet Protocol (IP) layer network messages, the network messages may occur at a higher layer in the protocol stack, and may even be application-layer network messages. The source machine may operate in a cloud computing environment, in the public Internet, or in any other environment. Likewise, the destination machine may also operate in a cloud computing environment, in the public Internet, or in any other environment. Furthermore, there may be any permutation of source and destination virtual machines including 1) both source and destination machines being virtual machines, 2) both source and destination machines being physical machines, 3) the source machine being a virtual machine and the destination machine being a physical machine, and 4) the source machine being a physical machine and the destination machine being a virtual machine.

Some introductory discussion of a computing system will be described with respect to FIG. 1. Then, the principles of operation of virtual machines will be described with respect to FIG. 2. Subsequently, the principles of the bypass of a load balancer will be described with respect to FIG. 3 and successive figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
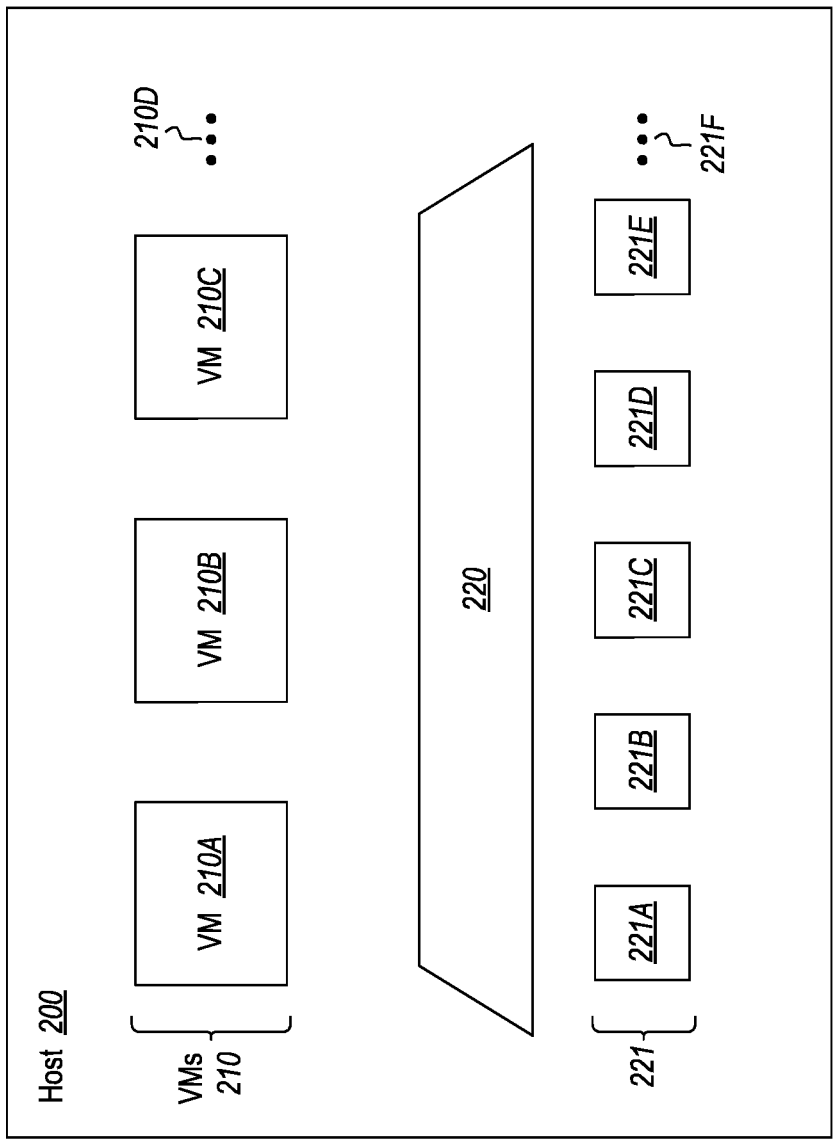
FIG. 2 abstractly illustrates a host computing system that hosts multiple virtual machines and provides access to physical resources through a hypervisor.

Having described a physical computing system (or physical machine) with respect to FIG. 1, the concept of a virtual computing system (or virtual machine) will now be described. One type of physical computing system is termed a host computing system (or simply "host"). Each host is capable of running one or more, and potentially many, virtual machines. For instance, FIG. 2 abstractly illustrates a host 200 in further detail. In the case of FIG. 2, the host 200 is illustrated as operating three virtual machines 210 including virtual machines 210A, 210B and 210C. However, the ellipses 210D once again represents that the principles described herein are not limited to the number of virtual machines running on the host 200. There may be as few as zero virtual machines running on the host with the only upper limit being defined by the physical capabilities of the host 200.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 200 includes a hypervisor 220 that emulates virtual resources for the virtual machines 210 using physical resources 221 that are abstracted from view of the virtual machines 210. The hypervisor 221 also provides proper isolation between the virtual machines 210. Thus, from the perspective of any given virtual machine, the hypervisor 220 provides the illusion that the virtual machine is interfacing with a physical resource, even though the virtual machine only interfaces with the appearance (e.g., a virtual resource) of a physical resource, and not with a physical resource directly. In FIG. 2, the physical resources 221 are abstractly represented as including resources 221A through 221F. Examples of physical resources 221 including processing capacity, memory, disk space, network bandwidth, media drives, and so forth.

Figure 3:
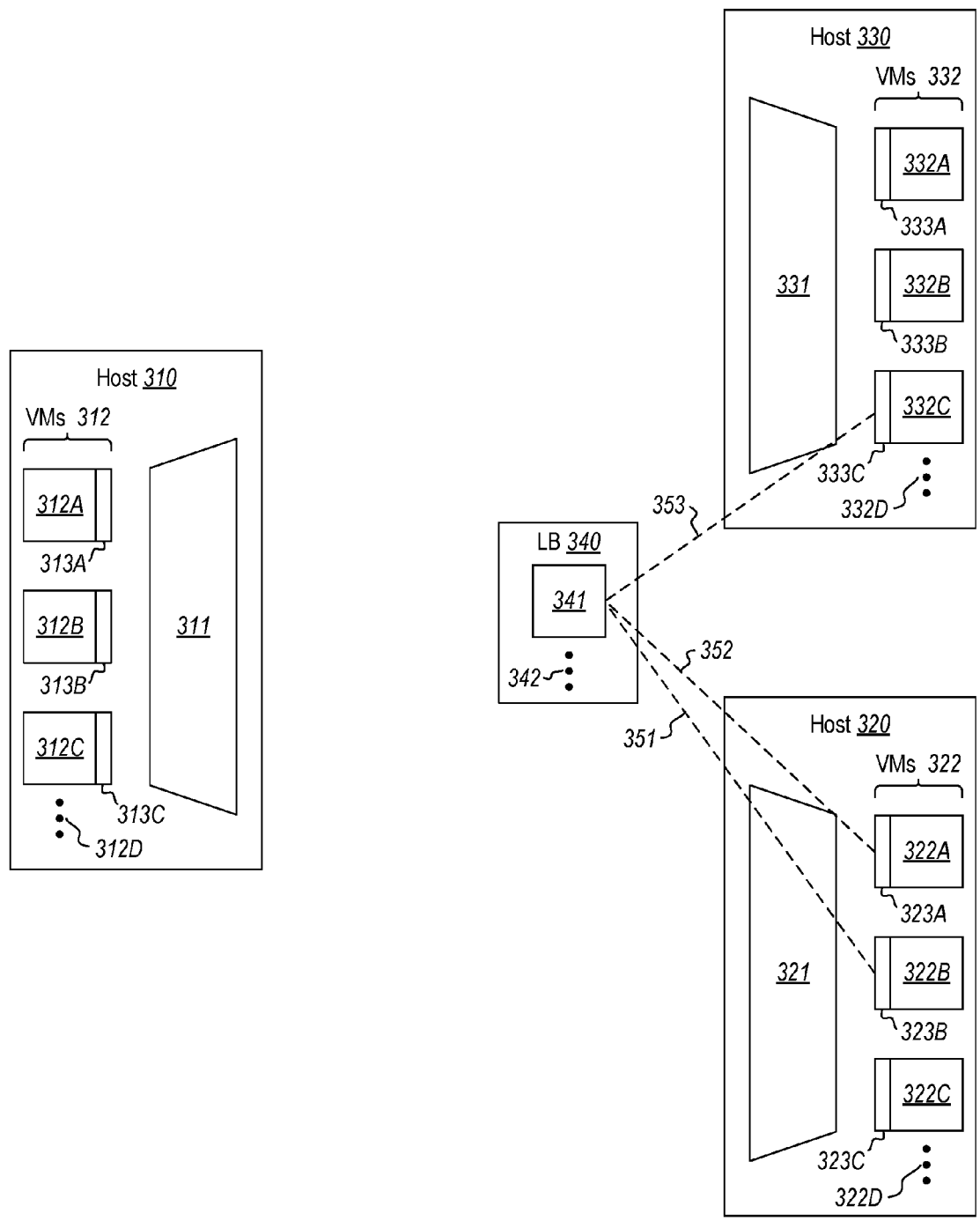
FIG. 3 abstractly illustrates a distributed environment in which three hosts are communicating, and in which a load balancer load balances across a virtual network address that may correspond to virtual machines on different hosts.

FIG. 3 illustrates a distributed system 300 that includes three intermediaries. In the case of FIG. 3, the communicating machines are virtual machines and thus, the three intermediaries are illustrated as being hypervisors within host computing systems 310, 320 and 330 (hereinafter referred to simply as "hosts"). Each host 310, 320 and 330 may be structured and operate as described above for the host 200 of FIG. 2. Each host has a hypervisor much as host 200 has hypervisor 220. For instances, hosts 310, 320 and 330 have respective hypervisors 311, 321 and 331.

Alternatively, if the virtual machines 312 were instead physical machines, the hypervisor 311 might be replaced by another intermediary, such as a vmswitch, suitable for physical machines. Likewise, if the virtual machines 322 were instead physical machines, the hypervisor 321 might be replaced by a vmswitch. Furthermore, if the virtual machines 332 were instead physical machines, the hypervisor 331 might also be replaced by a vmswitch. Accordingly, throughout the remainder of this description, where the terms "source virtual machine" and "source host" are referred to, these terms may be replaced by respective terms "source physical machine" and "source vmswitch". Likewise, where the terms "destination virtual machine" and "destination host" are referred to, these terms may be replaced by respective terms "destination physical machine" and "destination vmswitch". Nevertheless, the example of FIGS. 4 through 7 will proceed with the discussion of the exchange in the specific example of a virtual machine.

Each host has virtual machines running thereon much as host 200 has virtual machines 210 running thereon. For instance, host 310 has running thereon virtual machines 312, including virtual machine 312A, 312B and 312C, although the ellipses 312D represent flexibility in the number of virtual machines running on the host 310. Host 320 has running thereon virtual machines 322, including virtual machine 322A, 322B and 322C, although the ellipses 322D represent flexibility in the number of virtual machines running on the host 320. Host 330 has running thereon virtual machines 332, including virtual machine 332A, 332B and 332C, although the ellipses 332D represent flexibility in the number of virtual machines running on the host 330. Each virtual machine is addressable by a routable device identifier. For instance, virtual machines 312A, 312B, 312C, 322A, 322B, 322C, 332A, 332B and 332C are addressable by respective routable device identifiers 313A, 313B, 313C, 323A, 323B, 323C, 333A, 333B and 332C.

The distributed system 300 also includes a load balancer 340 that gets traffic for virtual network address 341. The load balancer 340 is configured such that messages that are received by the load balancer 342 and that are addressed using the virtual network address 341, are distributed to one of a group of virtual machines associated with the virtual network address. For instance, there are three virtual machines associated with the virtual network address 341 including virtual machine 322B (as represented by association 351), virtual machine 322A (as represented by association 352) and virtual machine 332C (as represented by association 353).

The load balancer 340 performs load balancing by selecting one of the virtual machines 332B, 332A or 332C to receive the message addressed to the virtual network, and dispatches the network message to that selected virtual machine. The ellipses 342 represents that the load balancer 340 may perform this load balancing function for other virtual network addresses also, which virtual network address may be associated with a distinct set of one or more virtual machines. The virtual network address includes a virtual Internet Protocol (IP) address. In the examples addressed below, virtual machine 312A will be a source virtual machine for a particular message flow, source host 310 will be a source host for that message flow, virtual machine 322A will be a destination virtual machine for that message flow, and host 320 will be a destination host for that message flow.

There are two embodiments of instructing the source host to bypass the load balancer. One will be referred to as a "separate instruction" embodiment in which the destination host provides an instruction to bypass that is separate and apart from the response to the first source-side network message associated with the flow. This first embodiment may be helpful in cases in which, for example, there might not be a response to the source-side network message. The second embodiment will be referred to as an "integrated response" embodiment in which the destination host provides bypass instructions within the response to the source-side network message.

Figure 4:
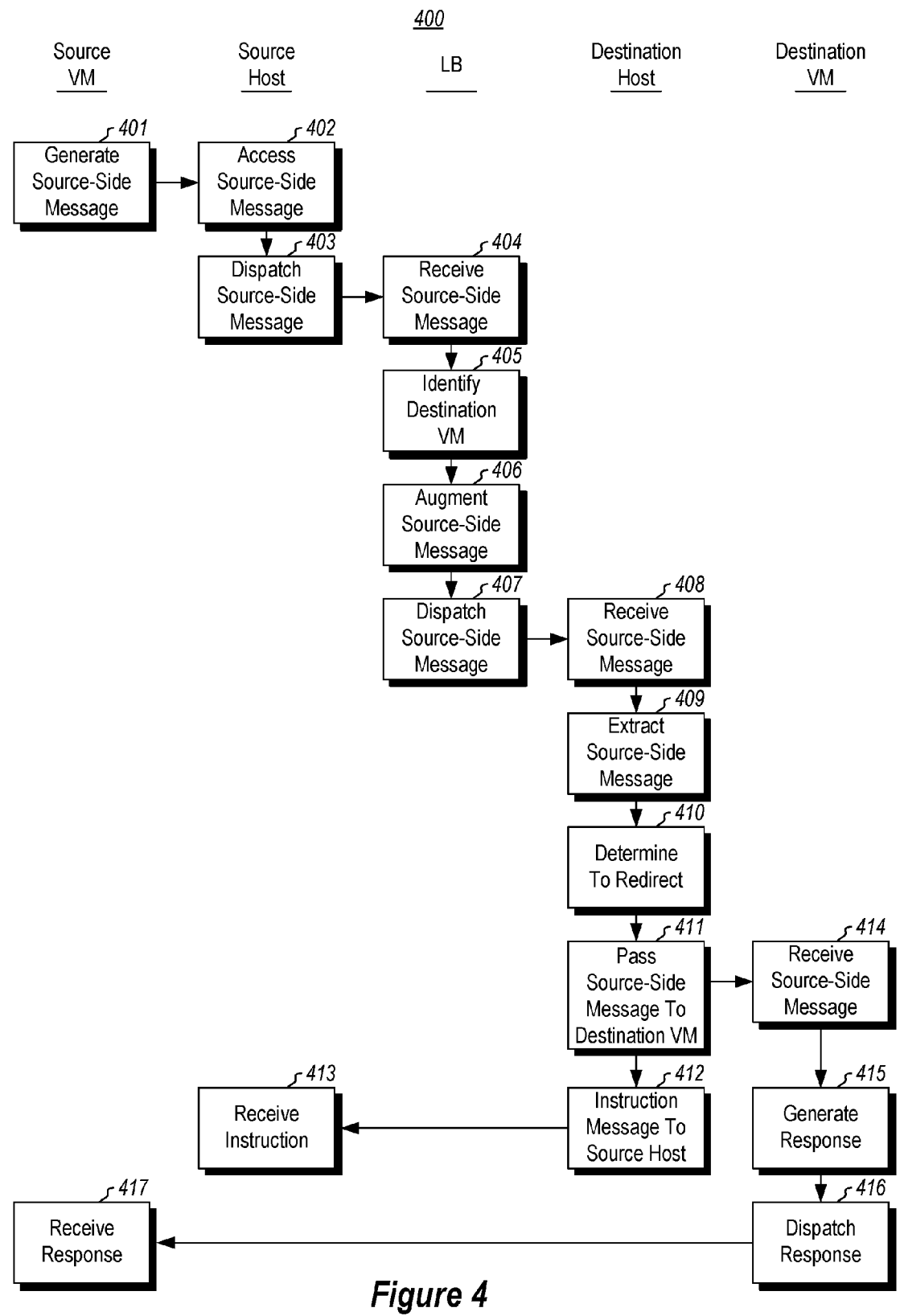
FIG. 4 illustrates a flowchart of a method for a source machine communicating a first exchange in a multi-message flow with a destination machine in a separate instruction embodiment.
Figure 5A:
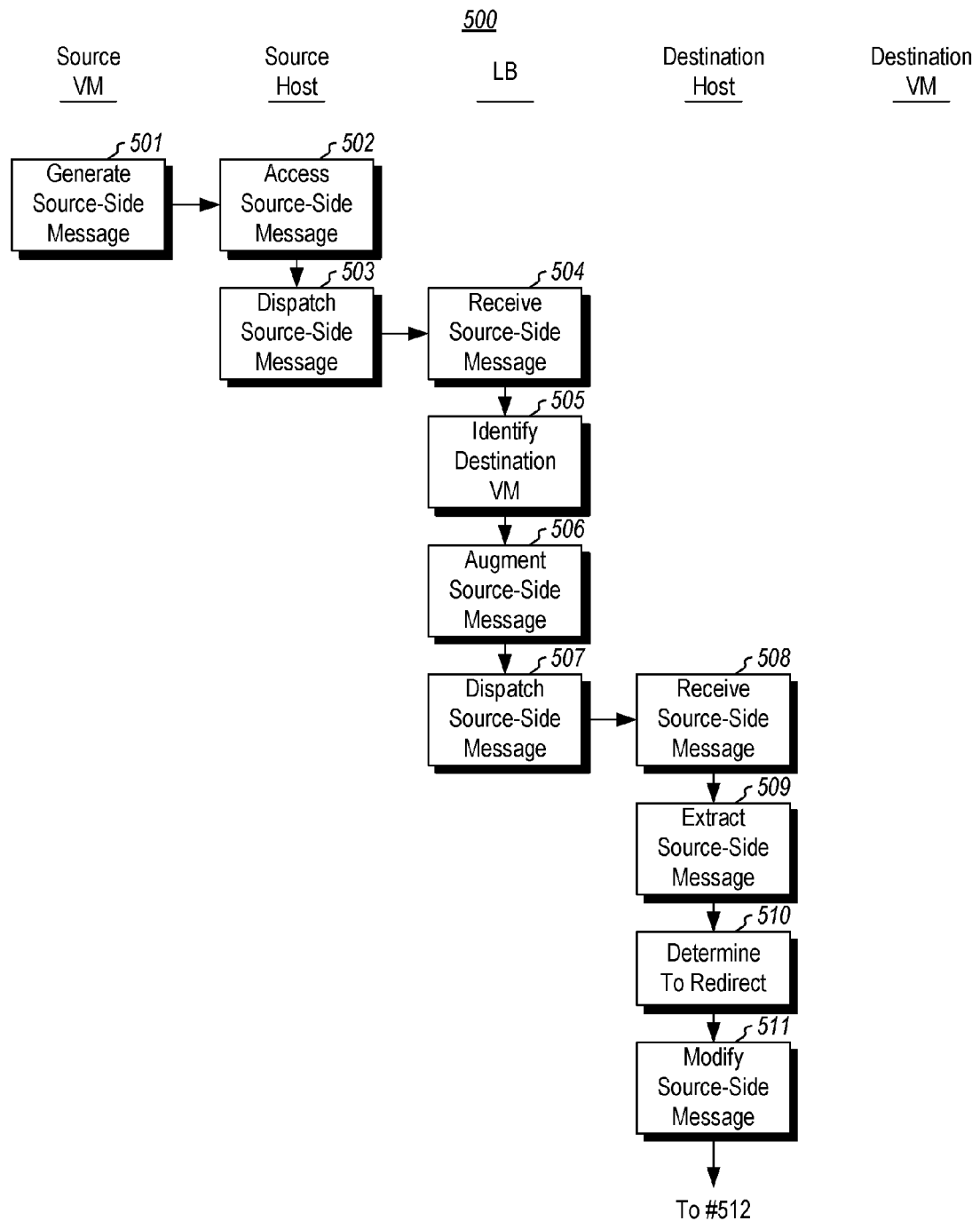
FIG. 5A illustrates a first half of a flowchart of a method for a source machine communicating a first exchange in a multi-message flow with a destination machine in an integrated response embodiment.
Figure 5B:
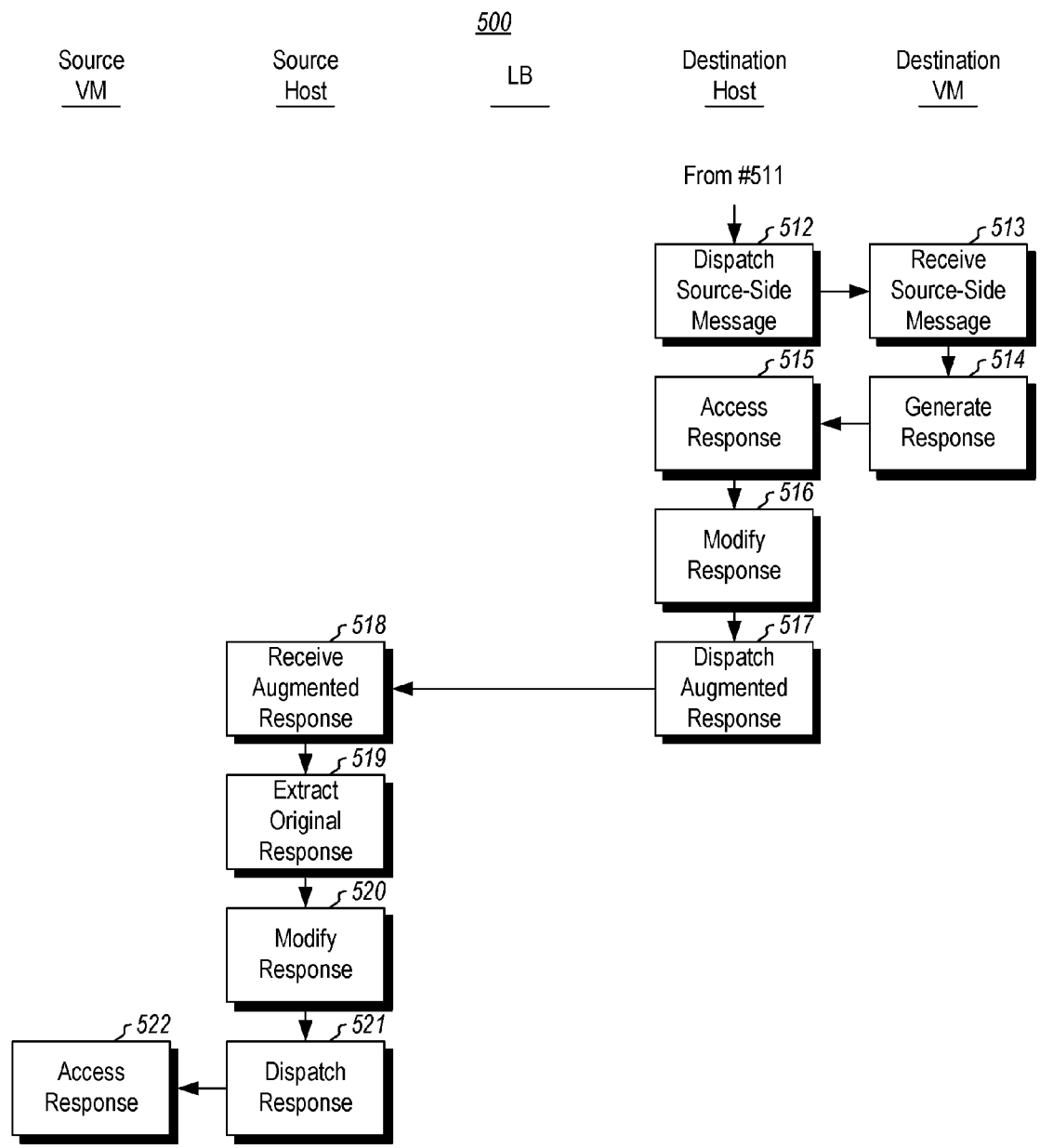
FIG. 5B illustrates a second half of the flowchart of FIG. 5A.

FIG. 4 illustrates a flowchart of a method 400 for a source virtual machine on a source host communicating a "first" exchange in a multi-message flow with a destination virtual machine hosted by a destination host. FIG. 4 specifically addresses the separate instruction embodiment. FIG. 5 illustrates a flowchart of a method that is similar to that of FIG. 4, except that it addresses the integrated response embodiment. In this description and in the claims, the terms "first", "second", and so forth are not intended to imply an actually temporal ordering, but merely to distinguish one item from another. For instance, the "first" exchange illustrated in FIG. 4 need not be the actual first exchange between the source virtual machine and the destination virtual machine, nor even the actual first exchange in a particular message flow. Nevertheless, the exchanges of FIGS. 4 and 5A and 5B, occur before the subsequent message of FIG. 7.

In FIG. 4 and FIGS. 5A and 5B, those acts that are performed by the source virtual machine (e.g., source virtual machine 312A) are in the left column of FIGS. 4 and 5 under the header "SOURCE VM". Those acts that are performed by the source host or hypervisor (e.g., host 310 or hypervisor 311) are in the second to left column under the header "SOURCE HOST". Those acts that are performed by the load balancer (e.g., load balancer 340) are in the middle column under the header "LB". Those acts that are performed by the destination host or hypervisor (e.g., host 320 or hypervisor 321) are in the second to right column under the header "DESTINATION HOST". Those acts that are performed by the destination virtual machine (e.g., destination virtual machine 322A) are in the right column under the header "DESTINATION VM". The methods 400 and 500 will be described concurrently up to the point where the "separate instruction" and "integrated response" embodiments diverge.

The methods 400 and 500 begin with the source virtual machine generating a source-side network message (acts 401 and 501). In this description and in the claims a "source-side" network message refers to a network message generated by the source virtual machine, hypervisor, or host; whereas a "destination-side" network message refers to a network message generated by the destination virtual machine, hypervisor, or host.

The destination address has a destination virtual network address that is routed through the load balancer, and a source address that includes a routable device identifier that addresses the source virtual machine. In the embodiments described herein, the virtual network address and the routable device identifiers are network-level addresses. However, the principles described herein also apply to addresses at other layers of the protocol stack, such as the application-level. In the embodiments described further below, the virtual network addresses are virtual Internet Protocol (IP) or (VIP) addresses, and the routable device identifiers are Device IP (or DIP) addresses.

FIG. 6A illustrates example data structure of the source-side network message generated by the source virtual machine in acts 401 and 501. In addition to data and a TCP/IP header, the network message includes the virtual IP address of the load balancer ($VIP_D$) as the destination address, as well as the routable device identifier of the source virtual machine ($DIP_S$) as the source address.

The source host (e.g., the source hypervisor 311) intercepts the source-side network message (acts 402 and 502). The source host then dispatches the source-side network message (acts 403 and 503) without altering the source or destination addresses. This might involve some configuration to ensure that the source address does not undergo Network Address Translation (NAT) and thus remains unchanged.

The source-side network message is routed through the network, and since the destination address is the virtual network address served by the load balancer, the load balancer receives the source-side network message (acts 404 and 504). For instance, referring to FIG. 3, the load balancer 340 may receive a network message that included the virtual network address 341 as the destination address.

The load balancer then selects one of the group of virtual machines associated with the virtual network address as being the destination virtual machine (acts 405 and 505). For instance, in FIG. 3, virtual machines 322B, 322A and 332C are associated with the virtual network address 341. In the example, suppose that the load balancer 340 selects virtual machine 322A as the destination virtual machine (and thus the host 320 would be the destination host).

The load balancer then augments the source-side network message to be from the load balancer to the selected destination virtual machine (acts 406 and 506). This augmentation may be done by, for example, encapsulating the original message with an additional operative addressing header. For instance, FIG. 6B shows the source-side network message which is the same as that of FIG. 6A, except that the encapsulating addressing layer (which will function to route the message) includes a destination address that includes the routable device identifier (e.g., $DIP_D$) that addresses the destination virtual machine (e.g., virtual machine 322A), and that includes a source address that addresses the load balancer (e.g., MUX).

The load balancer then dispatches the augmented source-side network message to the selected destination virtual machine (acts 407 and 507). For instance, the load balancer 340 may dispatch the augmented source-side network message illustrated in FIG. 6B to the destination virtual machine 322A.

The destination host then receives the augmented source-side network message (acts 408 and 508), and accesses the pre-augmented version of the source-side network message (acts 409 and 509). For instance, in the context of the network message of FIG. 6B, the message may be decapsulated in order to arrive again at the message of FIG. 6A.

The destination host then determines that the source host is to address subsequent network messages originated from the source virtual machine and associated with the same multi-message flow to the destination virtual machine in a manner that bypasses the load balancer (acts 410 and 510). For instance, the destination hypervisor 321 may have been previously instructed to cause redirection to happen for any flow from any source virtual machine that arrives via the load balancer.

The destination host then provides the redirection instruction to the source host. However, as previously mentioned, there are two different embodiments described herein for providing this instruction. In the embodiment of FIG. 4, which describes the separate instruction approach, the instruction is provided out-of-band from any response to the source-side network message.

In the separate instruction approach, the source-side network message is passed to the destination virtual machine (act 411). In addition, the instruction message is dispatched from the destination host to the source host (act 412), which receives the instruction (act 413). Although the instruction message is shown as being dispatched (act 412) after the source-side network message is passed (act 411) to the destination virtual machine, there is no timing dependency between those two acts. The destination virtual machine receives the source-side network message (act 414), and if a response is to be generated, generates the response (act 415), and dispatches the destination-side network message (i.e., the response) to the source virtual machine (act 416). The source virtual machine then receives the response (act 417)

Returning to FIG. 5, and act 510, the destination host determines that the flow is to be redirected to bypass the load balancer. The destination host or hypervisor then modifies the source-side network message such that the destination address includes a routable device identifier that addresses the destination virtual machine (act 511). For instance, FIG. 6A illustrates the source-side network message that was extracted from the augmented source-side network message received from the load balancer. FIG. 6C illustrates the source-side network message but in which the destination address changes from the virtual network address ($VIP_D$) of the load balancer to the routable device identifier ($DIP_D$) of the destination virtual machine.

Referring to FIG. 5B, the destination host then passes the modified source-network message to the destination virtual machine (act 512), which receives the modified-source side network message (act 513). The destination virtual machine then generates a destination-side network message (act 514), which will be referred to hereinafter simply as "the response". FIG. 6D illustrates an example response to the source-side network message of FIG. 6C. The source and destination addresses are reversed as is typical of any response. The destination address includes the routable device identifier ($DIP_S$) that addresses the source virtual machine, and the source address is the routable device identifier ($DIP_D$) that addresses the destination virtual machine.

The destination host accesses (act 515) and modifies the response (act 516) so that the source address includes the virtual network address that addresses the load balancer. FIG. 6E illustrates such a modified response. In this case, although not required, the original response is encapsulated with an addressing header which again specifies the routable device identifier ($DIP_S$) as the destination address, but the virtual network address ($VIP_D$) of the load balancer as the source address. The destination host then dispatches the augmented response to the source virtual machine (act 517).

The source host receives the augmented response (act 518), and extracts the original response from the response (act 519). For instance, in the case of the encapsulated response of FIG. 6E, the source host may decapsulate the response to obtain the originally generated response represented in FIG. 6D. The source host then modifies the original response so that the source address includes the destination virtual network address of the load balancer (act 520). The source host also notes the routable device identifier (e.g., $DIP_D$) of the destination virtual machine for modification described hereinafter associated with subsequent source-side network messages. As an example, FIG. 6F illustrates a modified response. The source host then dispatches the response (act 521), which is received by the source virtual machine (act 522).

From the perspective of the source virtual machine, the source virtual machine issued a message to the virtual network address, and received a response from the virtual network address. In the background, the source host has been configured to redirect subsequent messages for the flow from the source host to bypass the load balancer.

In some embodiments, to facilitate the case where the source host is not capable of responding to an instruction to redirect subsequent flow messages, the destination host might also return a normal response to the original source-side network message that does not include an instruction. For instance, FIG. 6F again illustrates an example of such a response. Comparing to the original source-side network message of FIG. 6A, note that the source and destination addresses are reversed. Thus, even a source host that is not capable of responding to the instruction represented in FIG. 6E, will still recognize the response of FIG. 6F as being responsive. Thus, the principles described herein may be rolled out in a controlled fashion.

Figure 7:
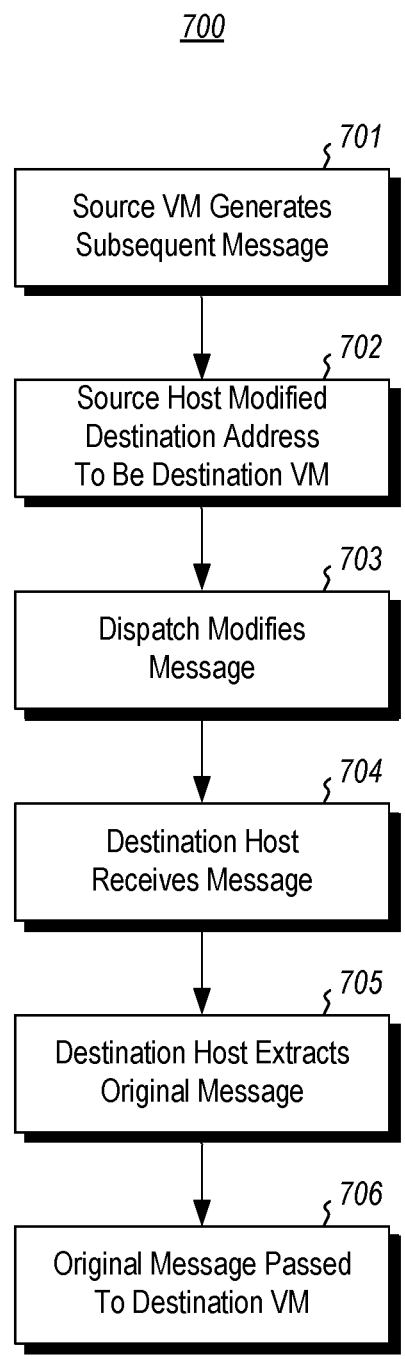
FIG. 7 illustrates a flowchart of a method for delivering subsequent network messages associated with the same flow from the source machine to the destination machine.

FIG. 7 illustrates a flowchart of a method 700 for delivering subsequent network messages associated with the same flow from the source virtual machine to the destination virtual machine. The method 700 may be performed for each subsequent network message. From the perspective of the source and destination virtual machines, the redirection is not apparent. The source virtual machine merely dispatch a second (or third, and so forth) source-side network message (act 701) that has a destination address that includes the destination virtual network address that addresses the load balancer, and that has a source address that includes a routable device identifier that addresses the source virtual machine. For instance, such a subsequent network message may be structured as described in FIG. 6A, and thus act 701 may be the same as acts 401 and 501 of FIGS. 4 and 5, respectively.

The source host then intercepts the subsequent source-side network message (act 702), and modifies the destination address of the network message so as to use the routable device identifier that addresses the destination virtual machine as a destination address. For instance, FIG. 6G illustrates the network message in which there has been an encapsulation of an additional addressing structure. In this case, the destination address remains the routable device identifier ($DIP_D$) of the destination virtual machine, but the source address is modified to be the routable device identifier (DIP$_S$) of the source virtual machine. This modified message is dispatched (act 703), and does not reach the load balancer (since the virtual network address VIP$_D$ is not in the controlling destination address field). But rather, the message arrives at the destination host (act 704). The destination host decapsulates the message to extract the original message issued by the source virtual machine (act 705), and passes that original message to the destination virtual machine (act 706). The load balancer played no role in this delivery.

The principles described herein allow for much of the flow messages associated with a flow to be routed directly to the destination virtual machine, thus making delivery more efficient. Furthermore, this is done while allowing load balancing to be decided by a load balancer early in the flow. Thus, load balancing may still be applied to the flow generally. Furthermore, if the load balancer were to malfunction, the flow may continue.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A destination intermediary computer system, comprising:
   one or more hardware processors; and
   one or more hardware storage devices having stored thereon computer-executable instructions that are structured such that, when executed by the one or more processors of the destination intermediary computer system, the computer-executable instructions configure the destination intermediary computer system to redirect a multi-message flow so as to bypass a load balancer, including configuring the destination intermediary computer system to perform at least the following:
      receive an augmented source-side message from a load balancer, the augmented source-side message comprising a source-side message previously received by the load balancer from a source intermediary serving a source machine along with a first augmented header that was added to the source-side message by the load balancer, a source-side message header including a virtual network address of the load balancer as a destination of the source-side message, and the augmented header including a network address of a destination machine served by the destination intermediary as a destination of the augmented source-side message;
      remove the first augmented header from the augmented source-side message to obtain the source-side message;
      determine that the source intermediary is to address subsequent network messages that originate from the source machine and that are associated with the same multi-message flow to the destination machine in a manner that bypasses the load balancer; and
      based on the determination:
         modify the source-side message header such that the destination of the source-side message comprises the network address of the destination machine;
         pass the modified source-side message to the destination machine;
      receive a response message from the destination machine that includes a response message header identifying a network address of the source machine as a destination of the response message, and identifying the network address of the destination machine as a source of the response message;
      augment the response message with a second augmented header identifying a network address of the source machine as a destination of the augmented response message, and identifying the virtual network address of the load balancer as a source of the augmented response message; and
      dispatch the augmented response message to the source machine while bypassing the load balancer.

2. The destination intermediary computer system of claim 1, wherein the response message lacks an instruction to bypass the load balancer.

3. The destination intermediary computer system of claim 1, wherein the virtual network address of the load balancer is a virtual internet protocol (IP) address that is load balanced across a plurality of destination machines.

4. The destination intermediary computer system of claim 1, wherein the destination intermediary computer system comprises a virtual machine host.

5. The destination intermediary computer system of claim 4, wherein the destination machine is a virtual machine executing on the destination intermediary computer system.

6. A source intermediary computer system, comprising:
   one or more hardware processors; and
   one or more hardware storage devices having stored thereon computer-executable instructions that are structured such that, when executed by the one or more processors of the source intermediary computer system, the computer-executable instructions configure the source intermediary computer system to cooperate in bypassing a load balancer, including configuring the source intermediary computer system to perform at least the following:
      receive a source-side message from a source machine, the source-side message having a virtual network address of a load balancer as a destination address, and having a routable device identifier of the source machine as a source address;
      send the source-side message to a load balancer serving a destination intermediary computer system;
      based on sending the source-side message to the load balancer, receive an augmented response from the destination intermediary computer system, the augmented message lacking an instruction to bypass the load balancer, the augmented response including a response from a destination machine served by the destination intermediary computer system, the augmented response having the routable device identifier of the source machine as its destination, and having the virtual network address of the load balancer as its source;
      extract the response from the augmented response;
      identify a routable device identifier of the destination machine from the response;
      modify the response so that a source address of the response includes the virtual network address of the load balancer;
      dispatch the modified response to the source machine; and
      redirect one or more subsequent messages received from the source machine to the destination machine, using the identified routable device identifier of the destination machine, to bypass the load balancer.

7. The source intermediary computer system of claim 6, wherein the augmented response encapsulates the response.

8. The source intermediary computer system of claim 7, wherein extracting the response from the augmented response comprises decapsulating the response from the augmented response.

9. The source intermediary computer system of claim 6, wherein the load balancer serves a plurality of destination intermediary computer systems.

10. The source intermediary computer system of claim 6, wherein sending the source-side message to the load balancer comprises preventing the source-side message from undergoing network address translation (NAT).

11. The source intermediary computer system of claim 6, wherein the virtual network address of the load balancer is a virtual internet protocol (IP) address that is load balanced across a plurality of destination machines.

12. The source intermediary computer system of claim 6, wherein the source intermediary computer system comprises a virtual machine host.

13. The source intermediary computer system of claim 12, wherein the source machine is a virtual machine executing on the source intermediary computer system.

14. A method, implemented at a destination intermediary computer system that includes one or more processors, for redirecting a multi-message flow so as to bypass a load balancer, the method comprising:
receiving an augmented source-side message from a load balancer, the augmented source-side message comprising a source-side message previously received by the load balancer from a source intermediary serving a source machine along with a first augmented header that was added to the source-side message by the load balancer, a source-side message header including a virtual network address of the load balancer as a destination of the source-side message, and the augmented header including a network address of a destination machine served by the destination intermediary as a destination of the augmented source-side message;
removing the first augmented header from the augmented source-side message to obtain the source-side message;
determining that the source intermediary is to address subsequent network messages that originate from the source machine and that are associated with the same multi-message flow to the destination machine in a manner that bypasses the load balancer; and
based on the determination:
modifying the source-side message header such that the destination of the source-side message comprises the network address of the destination machine;
passing the modified source-side message to the destination machine;
receiving a response message from the destination machine that includes a response message header identifying a network address of the source machine as a destination of the response message, and identifying the network address of the destination machine as a source of the response message;
augmenting the response message with a second augmented header identifying a network address of the source machine as a destination of the augmented response message, and identifying the virtual network address of the load balancer as a source of the augmented response message; and
dispatching the augmented response message to the source machine while bypassing the load balancer.

* * * * *